United States Patent [19]
Wakabayashi

[11] 3,716,297
[45] Feb. 13, 1973

[54] BRIGHTNESS COMPENSATING SYSTEM OF DISPLAY APPARATUS

[75] Inventor: Hajime Wakabayashi, Tokyo, Japan

[73] Assignee: Iwatsu Electric Company, Ltd., Tokyo, Japan

[22] Filed: Sept. 16, 1970

[21] Appl. No.: 72,599

[30] Foreign Application Priority Data

Sept. 26, 1969 Japan ................................44/76438

[52] U.S. Cl.......................355/67, 178/6.7 R, 315/22
[51] Int. Cl...............................................G03b 27/54
[58] Field of Search..........355/67; 178/6.7 R; 315/22

[56] References Cited

UNITED STATES PATENTS 2,448,299 8/1948 Dorne ..................................315/22
3,206,633 9/1965 Jones....................................315/22
2,567,861 9/1951 Silliman.................................315/22
2,416,200 2/1947 Nagel ....................................315/22

*Primary Examiner*—Samuel S. Matthews
*Assistant Examiner*—Monroe H. Hayes
*Attorney*—Chittich, Pfund, Birch, Samuels & Gauthier

[57] ABSTRACT

In a display apparatus, e.g., a cathode ray tube, in which the image displayed by the apparatus is processed, e.g., photographed by a camera, a function circuit is provided to generate a brightness compensation voltage determined by the characteristics of the lens of the instantaneous deflection of the cathode ray with the brightness compensation voltage is applied to the brightness adjuster associated with the deflection coils of the cathode ray tube.

4 Claims, 9 Drawing Figures

INVENTOR.
Hajime Wakabayashi
BY Chittick, Pfund, Birch, Samuels & Gauthier

INVENTOR
Hajime Wakabayashi
BY Chittick, Pfund, Birch, Samuels & Gauthier

BRIGHTNESS COMPENSATING SYSTEM OF DISPLAY APPARATUS

BACKGROUND OF THE INVENTION

This invention relates to a brightness compensating system of display apparatus, and more particularly to an efficient brightness compensating system when photographing images of letters, patterns and the like displayed on display surfaces.

To photograph images such as letters, patterns, symbols and the like which are displayed on a display surface of a display device, such as a fluorescent screen of a cathode ray tube it is usual to dispose a lens 3 of a camera in front of the screen 2 of the cathode ray tube 1 to project the image on a photographic film 4, as diagrammatically shown in FIG. 1. Generally, the brightness of the image displayed on the screen tends to decrease from the center B towards the edges A and C of the screen. For this reason when the image of a vertical line shown in FIG. *2a* is photographed the image photographed is thick at the center B′ and gradually decreases its width towards opposite ends A′ and C′ as shown in FIG. *2b*. Considering this phenomenon in more detail with reference to FIGS. 3a, *3b* and *3c*, a rectangle shown by dotted lines in FIG. *3a* represents the ideal brightness of a signal applied at a point *a* while a characteristic shown by a solid line represents the brightness actually obtained. When this image is focused on the photographic film 4 through lens 3, in most cases, light quantity is abundant near the center of the lens but decreases towards the periphery of the lens. In other words, it is well known in the art that, where the brightnesses at points A and B on the screen are equal, the total quantity of the light from point A on the screen to point B′ on the photographic film is less than the total quantity of light from point B on the screen to point B′ on the film. Accordingly, where the light quantity is small, the brightness on the photographic film 4 is shown by a characteristic curve shown in FIG. *3b* whereas when the light quantity is large the brightness is shown by a characteristic curve shown in FIG. *3c*. Generally, the photographic film senses the light only when it receives light exceeding a predetermined quantity, so that in the case of FIG. *3b* the film responds to a width $d(A')$ while in the case of FIG. *3c*, a width $d(B')$ (where $d(B') > d(A')$). This is the reason that an image of the pattern which is thickest at the center B′ and gradually decreases its width towards opposite ends A′ and C′ is obtained as shown in FIG. *2b*.

To solve this problem, it has been the prior practice to display an image of the correct brightness on the display surface and to photograph the image by using a high grade camera having a high accuracy lens of large diameter. This requires display apparatus of complicated circuit construction and an expensive, bulky and heavy camera.

SUMMARY OF THE INVENTION

It is an object of this invention to eliminate the necessity of utilizing such expensive high grade camera and a display apparatus of complicated circuit construction.

According to this invention, this object can be accomplished by providing an automatic compensating system which varies the brightness of the displayed image in accordance with the characteristics of the device for processing the image, that is the characteristics of the camera lens.

In accordance with a preferred embodiment of this invention, in a combination wherein the image displayed on the fluorescent screen of a cathode ray tube is photographed by a camera there is provided a brightness compensating system comprising a function circuit means which processes a function determined according to the characteristics of the camera lens and the output of the function circuit means is applied to the deflection coils of the cathode ray tube as the brightness compensation voltage.

BRIEF DESCRIPTION OF THE DRAWINGS

The invention can be more fully understood from the following detailed description when taken in conjunction with the accompanying drawings in which.

Figure 4:
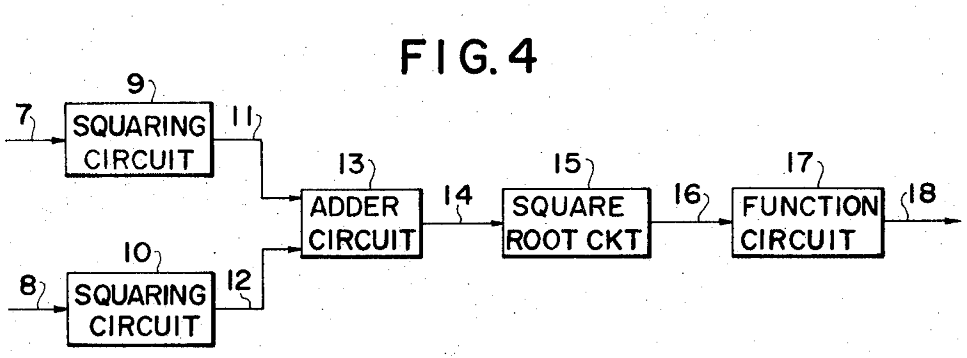
Figure 5A:
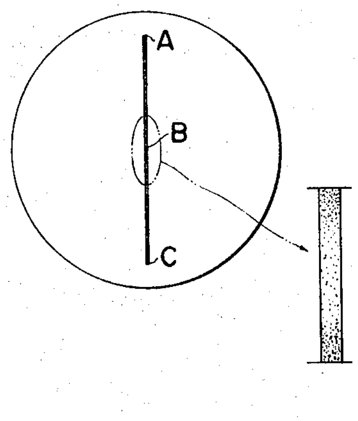
Figure 5B:
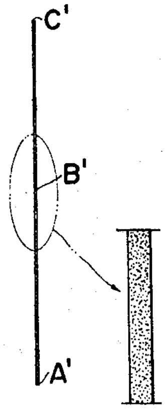

FIGS. *2a* and *2b* show the relationship between an image and a pattern formed on a photographic film obtained by a prior method;

FIGS. *3a*, *3b* and *3c* show characteristic curves to explain the relationship between the position of the image on the display surface, brightness of the images on the display surface and the photographic film;

FIG. 4 is a block diagram of one embodiment of the novel brightness compensating system of the display apparatus and FIGS. *5a* and *5b* show the relationship between the image on the display surface and the pattern on the photographic film obtained by the system shown in FIG. 4.

DESCRIPTION OF THE PREFERRED EMBODIMENT

Figure 1:
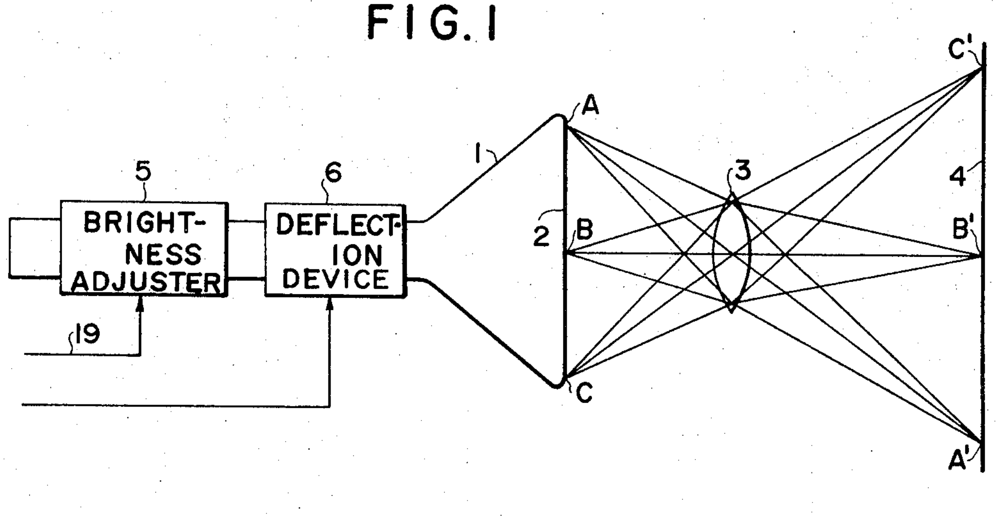
FIG. 1 is a diagram to explain a method of photographing an image on a display surface of a display apparatus.
Figure 2A:
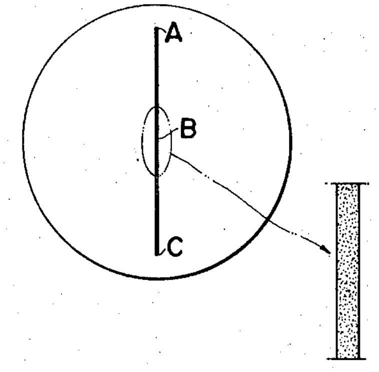
FIG. 2a PRIOR ART
Figure 2B:
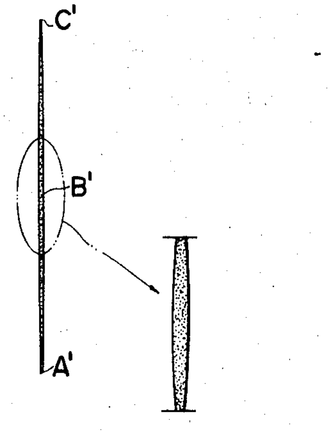
FIG. 2b PRIOR ART
Figure 3A:
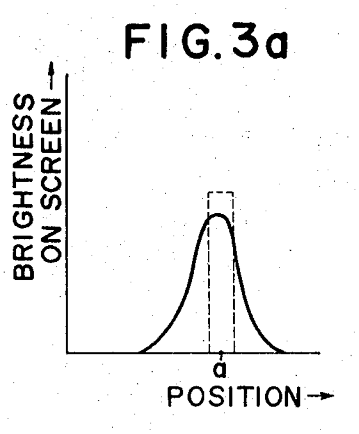
Figure 3B:
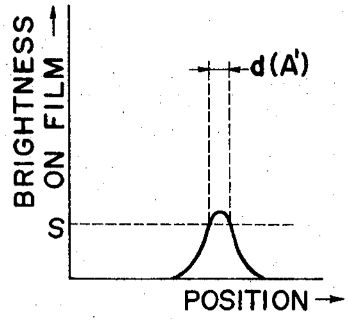
Figure 3C:
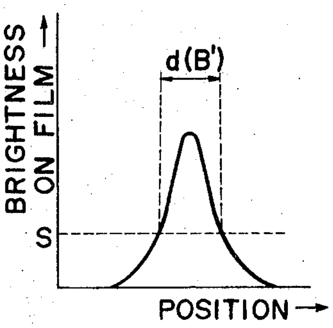

Referring now to FIG. 4 there is shown an example of the novel brightness compensation system of display apparatus, such as a cathode ray tube. As shown in FIG. 1, a cathode ray tube 1 is usually provided with a conventional brightness adjuster 5. According to this invention in addition to the usual brightness adjusting voltage, a brightness compensating voltage generated by the circuit shown in FIG. 4 is applied to the brightness adjuster 5 to display an image on the fluorescent screen 2 of the cathode ray tube 1 in the form of a straight line which is most dark at the center and gradually increases its brightness towards opposite ends as shown in FIG. *5a*. Accordingly, when projected upon the photographic film 4 the image gives a pattern of a straight line having uniform width throughout the length thereof as shown in FIG. *5b*. In this manner, by compensating automatically the brightness of the image displayed on the screen 2 according to the distance from the center of the image it is possible to readily compensate for the characteristics of the camera lens thus enabling use of cameras of ordinary grade.

More particularly, assuming now that the deflection device 6 associated with cathode ray tube 1 (FIG.1) is of the electromagnetic type comprising X and Y deflection coils, portions of the signals 7 and 8 applied to these deflection coils are applied to squaring circuits 9 and 10 (FIG.4) to respectively form squared values of X and Y deflection quantities $x^2$ and $y^2$. Signals 11 and 12 corresponding to these squared values are supplied to an adder circuit 13. A sum signal 14 from adder circuit 13 is supplied to a square root circuit 15 to produce the square root thereof. A signal 16 representing $\sqrt{x^2+y^2}$ is supplied to a function circuit 17. Since output 16 representing $\sqrt{x^2+y^2}$ is a current corresponding to the distance between the center of the fluorescent screen 2 and a given display point, the function circuit 17 provides the desired brightness compensation voltage. Although any one of well known function circuits may be used in this invention its input-output characteristics should be determined by measuring the characteristics of the camera lens. The output from function circuit 17, or the brightness compensation circuit 18 is superposed upon the brightness voltage 19 and the superposed voltages are applied to the brightness adjuster 5 shown in FIG. 1.

Although a linear image has been shown for the sake of simplicity it will be clear that the novel system is also applicable to other shapes of patterns such as letters, figures, symbols or the like.

Instead of the illustrated cathode ray tube, other types of display apparatus in the form of solid state or plasma may also be used. It is also possible to automatically compensate for the displayed brightness in accordance with the position of the image on the display surface.

Although the embodiment has been described in terms of the photography it is to be pointed out that the invention is also applicable to patterns produced by the flying spot system. More specifically, when scanning an object by the flying spot system, the current obtained by the photoelectric conversion of the reflected light or the light transmitted through the object generally varies its magnitude according to the position of the light spot so that it is difficult to obtain the desired current at all positions just like in the case of photography. Thus, it is possible to obtain the desired current by automatically adjusting the brightness of the flying spot according to its position. Generally speaking, in display apparatus including a cathode ray tube and the like, where the brightness characteristics of the associated device is not matched with the position of the image on the display surface it is possible to correct this mismatch by the automatic compensation of the brightness of the display apparatus.

Thus, it will be clear that this invention provides a novel brightness compensation system of display apparatus which can manifest the desired characteristic by mere compensation of the display apparatus in accordance with the position of the image on the display surface thereof without the necessity of imposing strict conditions upon associated apparatus. Thus, this invention enables the required compensation with simple and inexpensive circuits. Moreover, in the case of photographing the image an inexpensive, low grade camera may suffice.

While the invention has been shown and described in terms of a preferred embodiment thereof it will be clear that many changes and modifications will occur to one skilled in the art within the spirit and scope of the invention as defined in the appended claims.

What is claimed is:

1. A system comprising:

a display device having a display surface for displaying illuminated images defined by coordinates on said surface;

a device associated with said display device for receiving and processing said images displayed on said display surface, said device having characteristics adversely effecting its processing of said images dependent on the coordinates of said images; and, a brightness compensating system for providing variable illumination intensities of said images on said display surface, said brightness compensating system comprising function circuit means responsive to said coordinates of said images on said display surface for producing a position function corresponding to the brightness of said images required to compensate for said adverse characteristics of said associated device; and means responsive to the output of said function circuit means for compensating the brightness of said images displayed on said screen.

2. The system according to claim 1 wherein said associated device is a photographic camera with a lens which decreases the brightness of the image focused on various areas of the camera's photographic film.

3. The system according to claim 1 wherein said display device comprises a cathode ray tube having X and Y deflection coils and said function circuit means includes squaring circuits respectively forming squared values $x^2$ and $y^2$, where $x$ and $y$ represent deflection quantities in the X and Y directions respectively, a square root circuit producing an output $\sqrt{x^2+y^2}$, a function circuit responsive to said output $\sqrt{x^2+y^2}$ to produce a brightness compensation voltage determined by the characteristics of said camera lens and said compensating means comprises means for applying said brightness compensation voltage for compensating the brightness of said image.

4. In a combination of a display device having a cathode ray tube with X and Y deflection coils and a display surface, and an image recording device having a photographic camera with a lens having characteristics which tend to decrease the brightness of the image focused on areas of a photographic film as a function of distance from the center, said image recording device being associated with said display device for processing an image displayed on said surface, a brightness compensating system comprising, function circuit means, which includes squaring circuits respectively forming squared values $X^2 + Y^2$, where X and Y represent deflection quantities in the X and Y directions respectively, a square root circuit producing an output $\sqrt{X^2+Y^2}$, a function circuit responsive to said output $\sqrt{X^2+Y^2}$ to produce a brightness compensation voltage determined by the characteristics of said camera lens and means for applying said brightness compensation voltage for compensating the brightness of said image.

* * * * *